US007483585B2

(12) United States Patent
Brakus, Jr.

(10) Patent No.: US 7,483,585 B2
(45) Date of Patent: Jan. 27, 2009

(54) IMAGE COMPRESSION USING VARIABLE BIT SIZE RUN LENGTH ENCODING

(75) Inventor: Edward W. Brakus, Jr., Natick, MA (US)

(73) Assignee: ATI Technologies ULC, Markham, Ontario (CA)

( * ) Notice: Subject to any disclaimer, the term of this patent is extended or adjusted under 35 U.S.C. 154(b) by 719 days.

(21) Appl. No.: 11/000,792

(22) Filed: Dec. 1, 2004

(65) Prior Publication Data
US 2006/0115170 A1 Jun. 1, 2006

(51) Int. Cl.
*G06K 9/36* (2006.01)
(52) U.S. Cl. .................. 382/245; 382/232; 382/233; 382/246
(58) Field of Classification Search ........... 382/232, 382/233, 245, 246; 369/103; 341/59, 58, 341/106, 65; 360/39; 375/240.26, E7.093; 709/247
See application file for complete search history.

(56) References Cited

U.S. PATENT DOCUMENTS

| | | | | |
|---|---|---|---|---|
| 3,906,485 | A * | 9/1975 | Hong et al. | 341/58 |
| 4,882,583 | A * | 11/1989 | Dimitri et al. | 341/59 |
| 5,784,631 | A * | 7/1998 | Wise | 382/246 |
| 7,095,783 | B1 * | 8/2006 | Sotheran et al. | 375/240.01 |
| 7,149,811 | B2 * | 12/2006 | Wise et al. | 709/247 |
| 7,230,986 | B2 * | 6/2007 | Wise et al. | 375/240.26 |

FOREIGN PATENT DOCUMENTS

EP    1115089 A2 *   7/2001

JP    02001217723 A *   8/2001

OTHER PUBLICATIONS

Technical Note TN 1023, "Understanding PackBits", Feb. 1, 1996, http://developer.apple.com/technotes/tn/tn/1023.html.
Tag Image File Format Rev 4.0, Apr. 31, 1987, http://palimpsest.stanford.edu/bytopic/imaging/std/tiff4.html.
Drafting Group on Draft Recommendation T.4, "Draft Recommendation T.4—Standardization of Group 3 Facsimile Apparatus for Document Transmission" http://www.faqs.org/rfcs/rfc804.html, 2003.
ITU-T Recommendation T.6, Terminal Equipment and Protocols for Telematic Services, "Facsimile Coding Schemes and Coding Control Funcitons for Group 4 Facsimile Apparatus", Fascicle VII.3—Rec. T.6, Blue Book, 1993.
ITU-T Recommendation T.4, Series T: Terminals for Telematic Services, "Standardization of Group 3 facsimile terminals for documents transmission", ITU-T Rec. T. 4, Jul. 2003.

* cited by examiner

*Primary Examiner*—Anh Hong Do
(74) *Attorney, Agent, or Firm*—Vedder Price P.C.

(57) ABSTRACT

Variable bit size run length encoding ("RLE") is used to encode uninterrupted runs of adjacent first symbols and adjacent second symbols within a sequence that may represent an image. The symbols may be 1s and 0s. The bit size used to encode a run length for a current run is varied in dependence on the bit sized used or required to encode a run length of a previous run of the same symbol type. Further, an image to be encoded may be transformed into an image/bit sequence representing changes from line to line in the image. By so transforming the image, the correlation from run length to run length of like colors is increased, thereby improving the efficiency of the variable bit size RLE.

29 Claims, 13 Drawing Sheets

40 — 00000000000000000000
0111110000001111000
01111110000011111100
01100011000111001110
01100001001110000010
01100001001100000000
01100001001100000000
01100011001100000000
01111100011000000000
01111110011000000000
01100001101100000000
01100000101100000000
01100000101100000000
01100000101100000000
01100000101110000010
01100001100111001110
01111111100011111100
01111111000001111000
00000000000000000000
00000000000000000000

50

60

```
00000000000000000000
01111100000001111000
00000010000010000100
00011101000100110010
00000010001001001100
00000000000010000010
00000000000000000000
00000010000000000000
00011101000000000000
00000001000000000000
00011110100000000000
00000001000000000000
00000000000000000000
00000000000000000000
00000000000010000010
00000001001001001100
00011110000100110010
00000000100010000100
01111111000001111000
00000000000000000000
```

IMAGE COMPRESSION USING VARIABLE BIT SIZE RUN LENGTH ENCODING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever.

FIELD OF THE INVENTION

The present invention relates generally to data compression techniques, and more particularly to methods, software and apparatus for compressing data using variable bit size, run length encoding. The invention is particularly well suited for bi-level image compression.

BACKGROUND OF THE INVENTION

Many modern computing applications require the storage, rendition, acquisition and/or transmission of data representing two colour (often referred to as bi-level) images.

For example, many electronic devices having some computing capability now display relatively simple, often black and white images, while a more complex, graphically richer operating system is being loaded. Similarly, such devices often present simple configuration screens and images to allow the change of system settings, and the upgrading of firmware. Example devices include DVD players, computers, computer video cards, video games and the like.

Similarly, wireless handheld scanners, wireless fax machines, and other devices acquire and transmit black and white images using radio frequencies or other transport media.

Whether such images are stored or transmitted, it is desirable to reduce the amount data used to represent the images. This reduces storage requirement and bandwidth requirements for the image.

Compression techniques suitable for the compression of such images are known. For example, a compression technique known as "Pack-bits" uses run length encoding to run length encode a bit sequence of 0s and 1s. CCITT Group 3 and 4 facsimile transmission compression rely on various encoding schemes to represent facsimile images.

Other known compression techniques suited for bi-level images include JBIG.

Although these known techniques are effective, they typically rely on compression techniques that are computationally quite complex. Moreover, they often fail to achieve high compression ratios for many simpler images.

Accordingly, there is a need for a relatively simple compression technique, suitable for compressing binary images.

SUMMARY OF THE INVENTION

Variable bit size run length encoding ("RLE") is used to encode uninterrupted runs of adjacent first symbols and adjacent second symbols within a sequence that may represent an image. The symbols may be 1s and 0s. The bit size used to encode a run length for a current run is varied in dependence on the bit sized used or required to encode a run length of a previous run of the same colour. Further, an image to be encoded may be transformed into an image/bit sequence representing changes from line to line in the image. By so transforming the image, the correlation from run length to run length of like colours is increased, thereby improving the efficiency of the variable bit size RLE.

In accordance with an aspect of the present invention, there is provided a method of encoding a bit sequence of alternating runs of adjacent 1s and adjacent 0s. The method includes determining the run-length of each of the runs of adjacent 0s in the sequence and determining the run-length of each of the runs of adjacent 1s in the sequence; and encoding each of the run-lengths of the runs of adjacent 0s using a varying bit size. The varying bit size used to encode each of the run-lengths of adjacent 0s is varied in dependence on the bit size used to encode a run-length of a prior run of adjacent 0s in the bit sequence.

In accordance with another aspect of the present invention, there is provided a method of decoding a series of run-lengths into alternating runs of adjacent 0s and 1s. The run lengths are encoded using varying numbers of bits. The method includes determining an assumed bit size used to encode a current run-length of 0s based on a bit size used to decode an immediately prior run length of 0s; increasing the assumed bit size of the current run-length if all bits in the run length having the assumed bit size have a defined pattern, to form an adjusted bit size where all bits in the run-length having the adjusted bit size do not have the defined pattern; and extracting a number of adjacent 0s, the number based on a value in binary of the run-length having the adjusted bit size.

In accordance with yet another aspect of the present invention, there is provided a computer readable medium storing a bit sequence representing a plurality of sequential tokens of varying bit sizes, each token representing data encoding a run length in a sequence of first and second symbols, or an indicator that the bit size of the next token in the plurality of sequential tokens has changed from the size of the current token.

In accordance with still another aspect of the present invention, there is provided a method of encoding a sequence of alternating runs of adjacent first symbols and adjacent second symbols. The method includes determining the run-length of each of the runs of adjacent first symbols in the sequence; determining the run-length of each of the runs of adjacent second symbols in the sequence; and encoding each of the run-lengths of the runs of adjacent first symbols using a varying bit size. The varying bit size used to encode each of the run-lengths of adjacent first symbols is varied in dependence on the bit size used to encode a run-length of a prior run of adjacent first symbols in the sequence.

In accordance with yet another aspect of the present invention, there is provided a data providing medium providing a bit sequence representing a plurality of sequential tokens of varying bit sizes, each token representing data encoding a run length in a sequence of first and second symbols, or an indicator that the bit size of the next token in the plurality of sequential tokens has changed from the size of the current token.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In figures which illustrate by way of example only, embodiments of the present invention.

DETAILED DESCRIPTION

As the present invention is directed methods and devices for compressing images, the invention lends itself to implementation in software and a wide variety of hardware. A person of ordinary skill will readily appreciate that the methods may for example be embodied in software executing on a general purpose computing device such as a personal computer, graphics workstation, mainframe or the like or in specialized hardware such as a facsimile machine, printer or integrated circuit forming part of a computing or other device. The invention is particularly well suited to battery powered embedded applications with limited computational resources. For purpose of illustration only, example embodiments of the invention are described as being embodied in software executing on a general purpose computing device.

Figure 1:
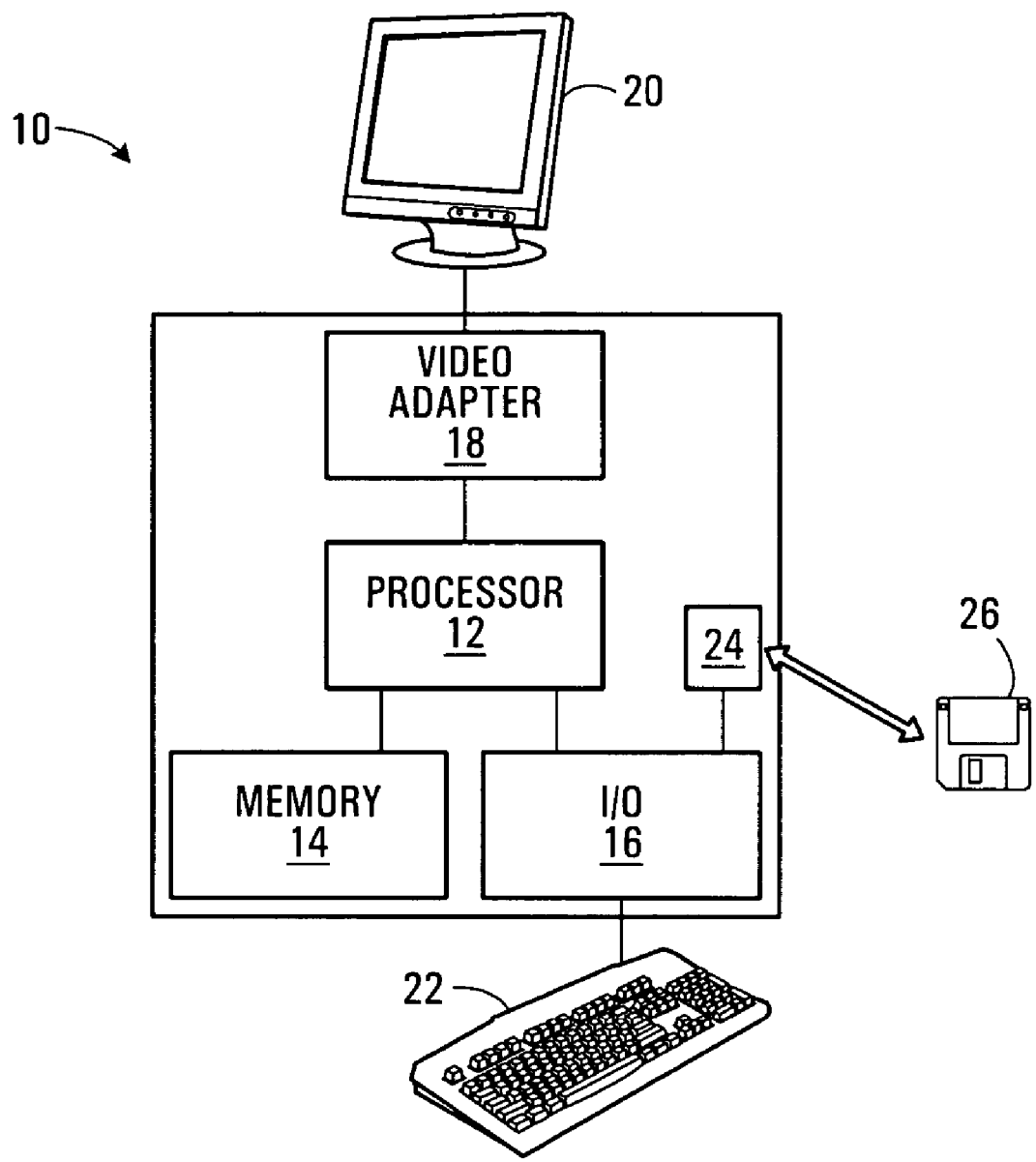
FIG. 1 is a schematic block diagram of a computing device used to execute software, exemplary of embodiments of the present invention.

Accordingly, FIG. 1 illustrates a conventional computing device 10 adapted to operate in manners exemplary of embodiments of the present invention. Device 10 includes a processor 12 in communication with computer memory 14, input/output interface 16, video adapter 18 and display 20. Device 10 may optionally include a peripheral device such as keyboard 22, disk drive 24, mouse not shown and the like. As well, device 10 may include one or more network interfaces and other computer peripherals known to those of ordinary skill. Processor 12 may be in a conventional central processing unit and may for example be a micro processor in the INTEL™ x86 family or a microprocessor of the like. Computer memory includes a suitable combination of random access memory, read-only memory and disk storage memory used by device 10 to store and execute software programs adapting device 10 to compress and/or decompress images in manners exemplary of the embodiments of the present invention. Exemplary software could, for example, be stored in read-only memory or loaded from an external peripheral such as drive 24, capable of reading and writing data to or from a computer readable medium 26 used to store software to be loaded into memory 14. Computer readable medium 26 may be an optical storage medium, a magnetic diskette, tape, ROM cartridge or the like.

As device 10 is a general purpose computing device, it further stores and executes software giving it basic capability to access such the device 10 and peripherals and includes basic input/output system and an operating system stored in memory 14.

Of interest, software within memory 14 includes application software exemplary of embodiments of the present invention used to compress and/or decompress bi-level images in manners exemplary of embodiments of the present invention.

Figures 2, 3:
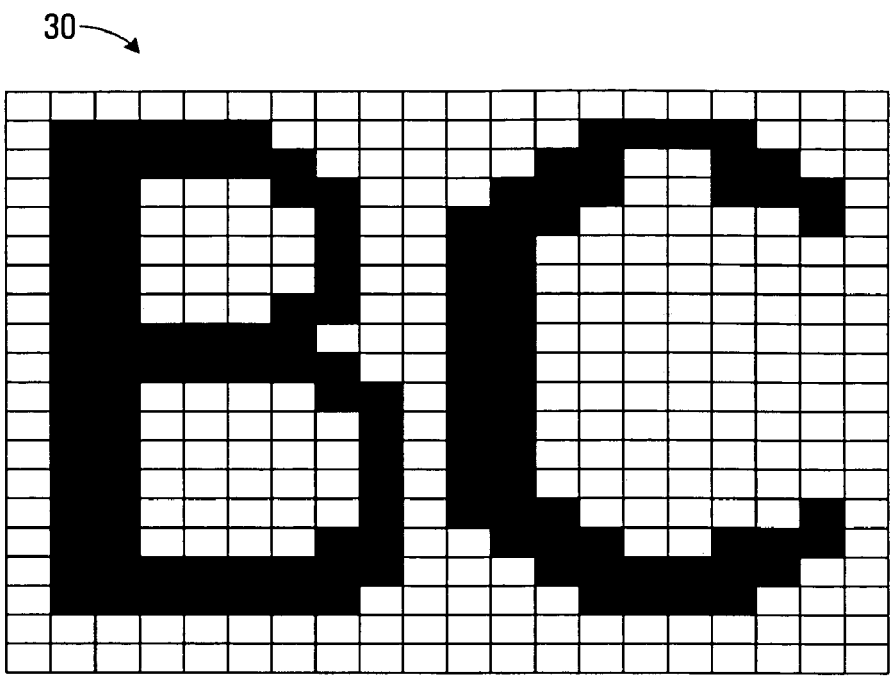
FIG. 2 is an example bi-level image to be compressed using software exemplary of embodiments of the present invention.
FIG. 3 is a bit sequence corresponding to the image of FIG. 2.

FIG. 2 illustrates an example bi-level image that may be compressed or decompressed by exemplary application software within memory 14. Specifically, as illustrated, an example image 30 is a rasterized image formed as a plurality of pixels organized in rows and columns. Exemplified image 30 includes 20 rows and 20 columns. As will be appreciated, exemplary methods may be used to compress images of arbitrary size. A relatively small image (20×20) is depicted for ease of illustration. Notably image 30 is a two colour image consisting of pixels that are either light or dark. Typically image 30 may be formed of pixels that are only black and white. As only two image colours are used each pixel may be represented by single bit.

FIG. 3 accordingly illustrates the bit sequence 40 corresponding to the image of FIG. 2. Although organized in rows and columns persons of ordinary skill will readily recognize that the bit pattern depicted in FIG. 3 will typically be stored or transferred as a contiguous bit sequence. Dimensions of the image (e.g. bits/row, and number of rows) may be pre-defined or detected and stored within ancillary data accompanying a compressed image.

Now, as will be appreciated, in uncompressed form, bit sequence 40 depicted in FIG. 3 occupies 20×20=400 bits. As noted, in many applications, it is desirable to reduce or compress the overall number of bits used to represent the image 30.

Accordingly, exemplary of embodiments of the present invention, run length encoding ("RLE") is used to encode uninterrupted runs of adjacent "1"s or "0"s within the bit sequence. A variable bit size is used to encode the length of each run. As well, for reasons that will become apparent, the image is encoded to form a transformed version of the image. This transformed image is compressed in place of the original image.

Figure 4:
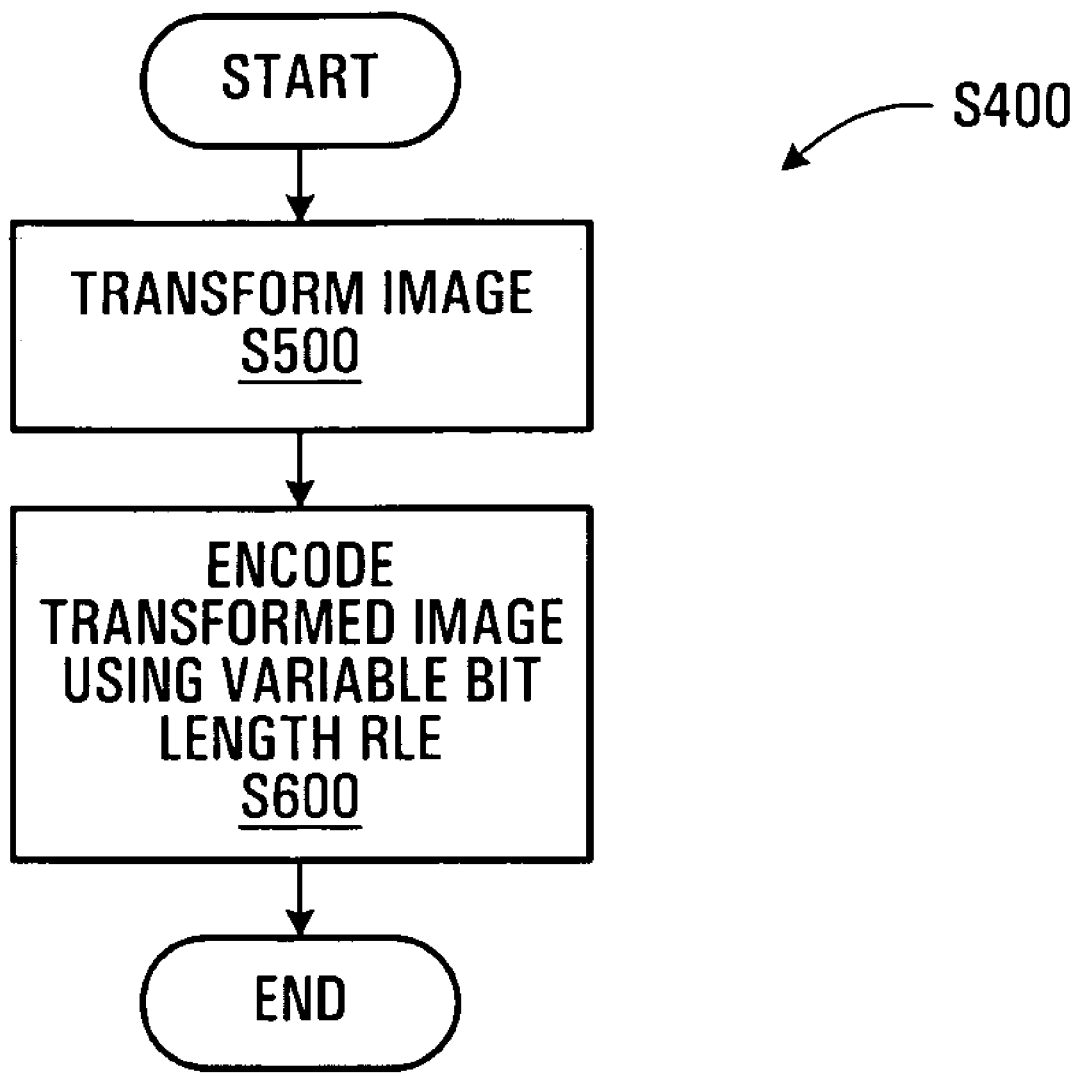
FIGS. 4, 5, and 6A-6C are flow charts illustrating exemplary steps used to compress a bi-level image, exemplary of embodiments of the present invention.

Specifically, FIGS. 4, 5 and 6A-6C schematically illustrate a variable RLE image compression method exemplary of embodiments of the present invention. As illustrated in FIG. 4, a rasterized m×n image to be compressed is initially transformed into an m×n image/bit sequence in steps S500. The dimensions of the rasterized image are assumed to be predetermined. Once transformed, the transformed bit sequence/image is encoded using variable bit size RLE in steps S600.

Figure 5:
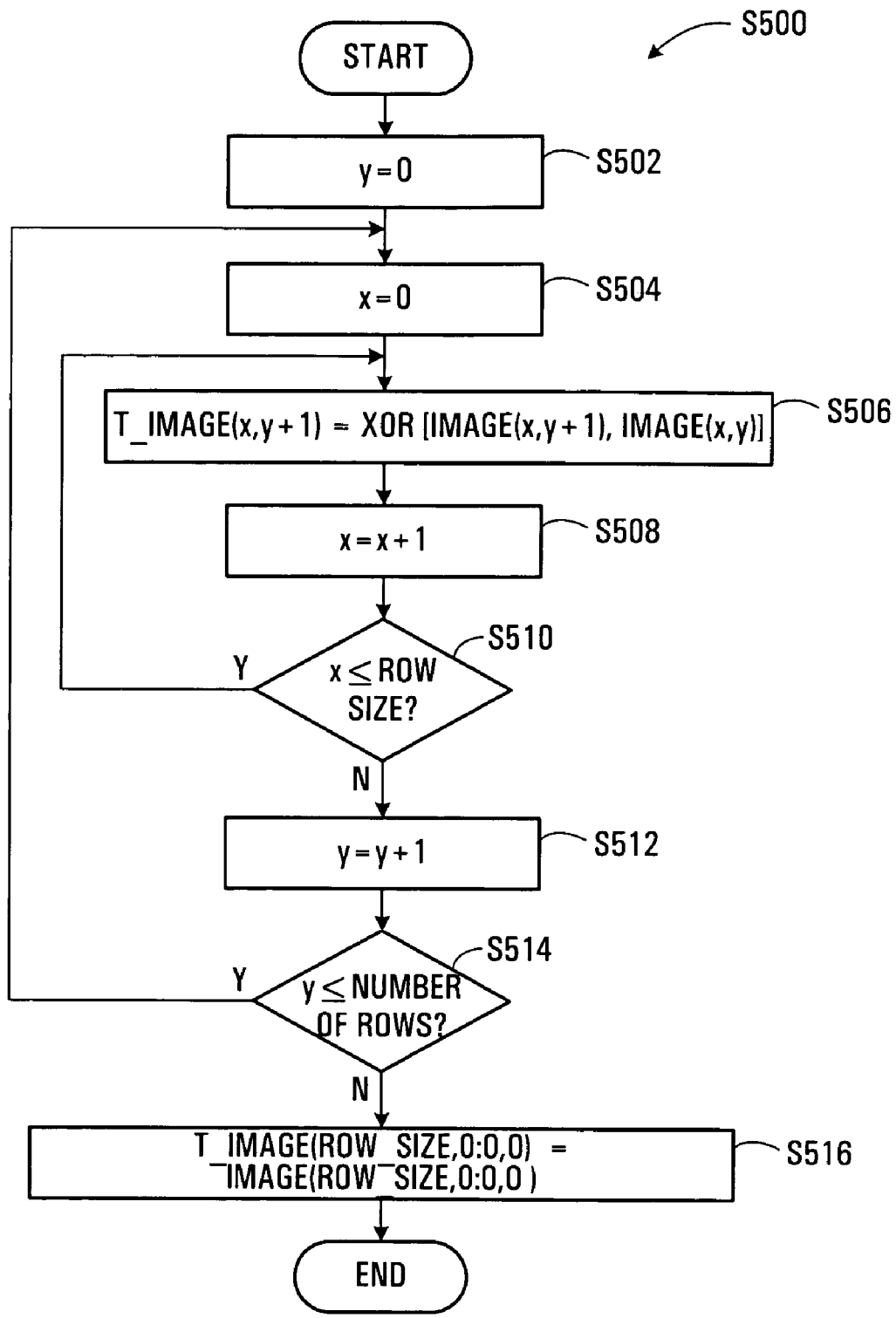

Steps S500 are further detailed in FIG. 5. Counters variables x and y are used to temporarily track row and column locations, respectively, within the image to be transformed and are initialized to 0 in steps S502 and S504. A bit sequence representing the image to be transformed is assumed to be accessible as a 2-dimensional array IMAGE (x,y). The transformed image will similarly be stored in 2-dimensional array T_IMAGE (x, y). Now, the transformed image T_IMAGE(x, y) is formed by calculating a bit pattern that represents the changes from row to row within the image IMAGE(x,y). This may be effected by XORing adjacent rows in the image. That is, row 2 of the transformed image, T_IMAGE, is calculated by XORing each individual pixel in row 1 of the original image with the corresponding pixel of row 2 of the original image (i.e. two pixels directly beneath each other in the original image, IMAGE). This is performed in step S506 for each pixel, and for all pixels within a row as a result of steps S508 and S510. Steps S506-S510 are repeated for all rows within the image as a result of steps S512-S514. The first line of the transformed image (i.e. row 0) remains the same. As such, values of row 0 of the transformed image T_IMAGE are set to equal to values in the first row of the original image IMAGE in step S516.

Figures 7, 8:
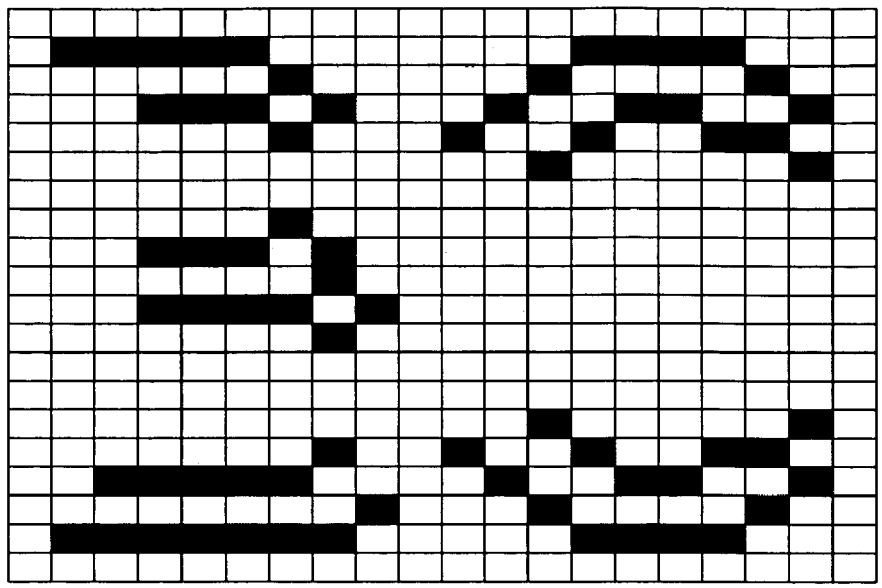
FIG. 7 is an example transformed bi-level image to be compressed using software exemplary of embodiments of the present invention.
FIG. 8 is a bit sequence corresponding to the image of FIG. 7.

An exemplary resulting transformed image 50 corresponding to the image of FIG. 2 is illustrated in FIG. 7. The corresponding bit pattern 60 is illustrated in FIG. 8.

Notably, transformation steps S500 are lossless. That is, the original image may be extracted from the transformed image simply reversing the operations performed, as detailed below. Additionally, for many images the correlation between adjacent rows of the image is high. As such, differences from row to row in the original image (IMAGE) are minor, and the resulting transformed image (T_IMAGE) will have a sparser distribution of dark pixels (1s) than the original image. Steps S500 effectively reduce any redundancy in images having adjacent lines that are similar. Put another way, for many images, the run-length of light pixels increases and the run-length of dark pixels decreases in the transformed image, as a result of transformation steps S500.

Once the transformed image, T_IMAGE, is formed, the bit sequence representing the transformed image is run length encoded: represented as a series of run lengths representing the length of runs of adjacent "0"s and adjacent "1"s in the sequence. The runs are run length encoded using variable number of bits.

Figure 6A:
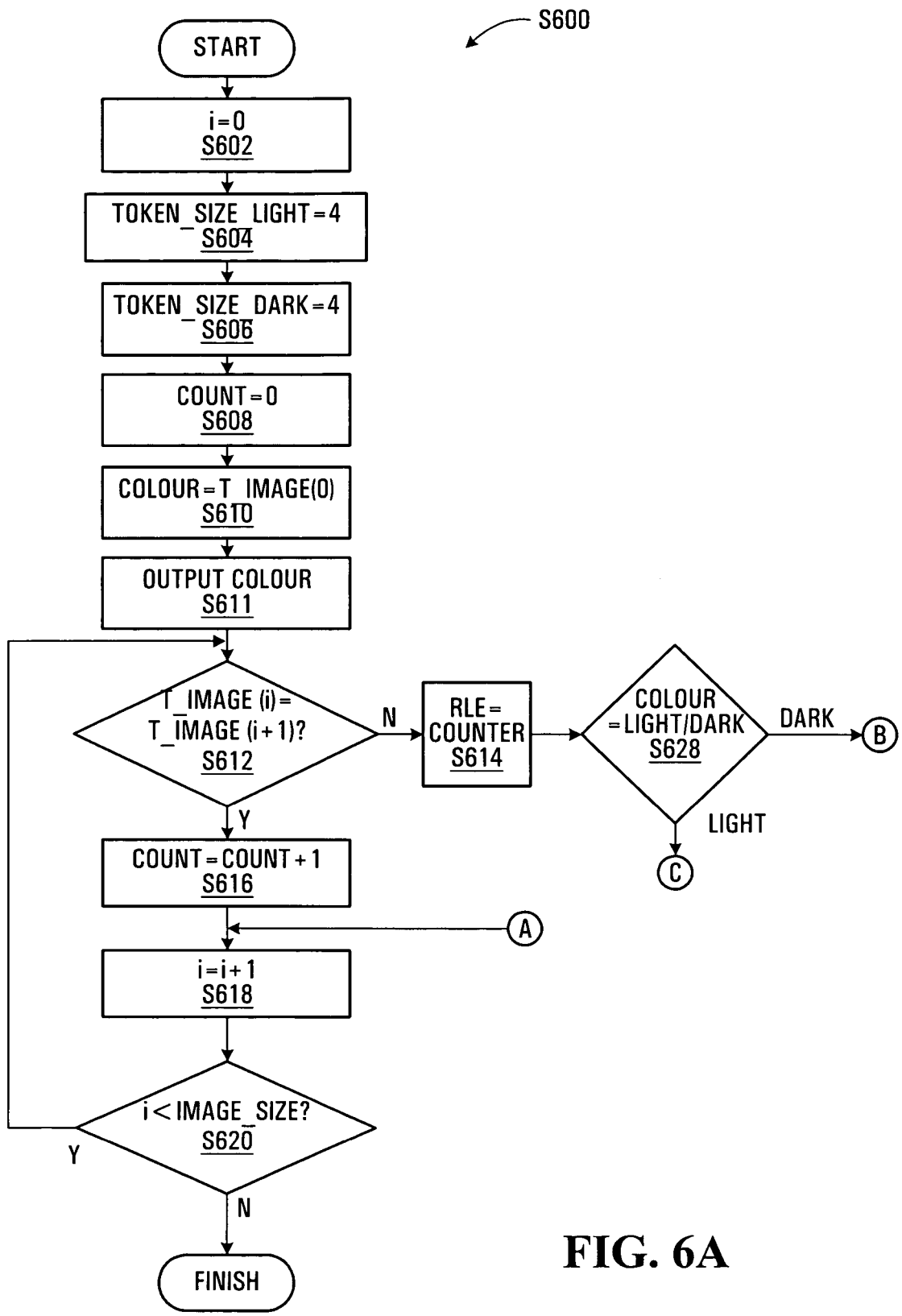
Figure 6B:
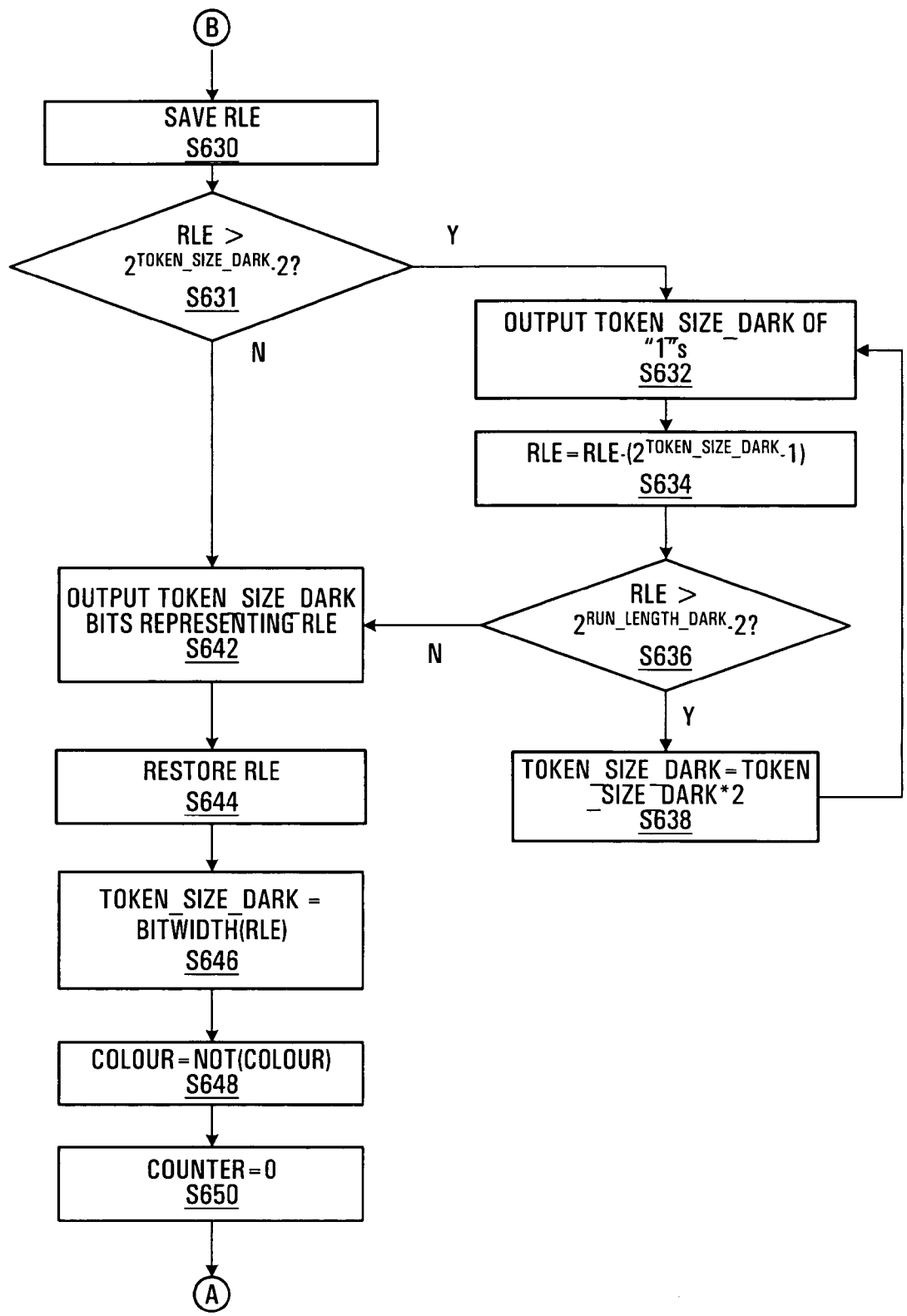
Figure 6C:
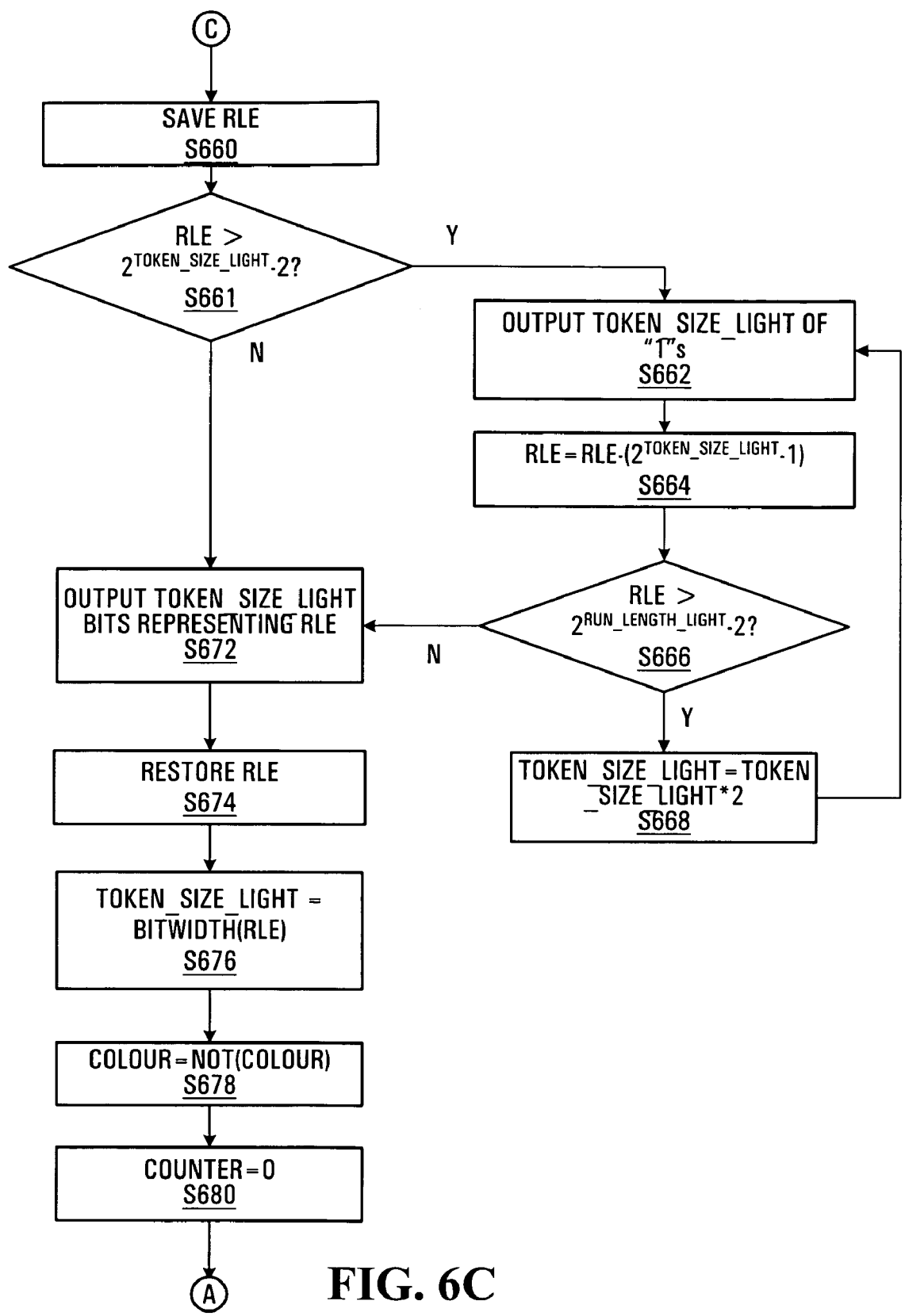

So, example steps S600 depicted in FIGS. 6A-6C count and encode the run length of zeros (i.e. light pixels) and ones (i.e. dark pixels) within the transformed bit sequence/image. For purposes of run length encoding, the two dimensional image is treated as a single one dimensional run of 1s and 0s, T_IMAGE(i). A temporary index counter i is used to index individual bits within the bit sequence of the transformed image T_IMAGE. Counter i is initialized to a value of 0 in step S602.

In the exemplary embodiment, two varying run length sizes are used. The varying sizes, in bits, are maintained in temporary counters, exemplified by counters TOKEN_SIZE_LIGHT and TOKEN_SIZE_DARK. These are set to an initial default value in steps S604 and S606. The token sizes, and thus run length sizes, are adjusted as required, from encoded run length to encoded run length. In the depicted embodiment, both counters are set to an initial value of four (4) signifying that four bits are used initially to encode run lengths of both light and dark runs.

A further temporary counter variable COUNTER is used count the length of the current run. The value of COUNTER is set to 0 in step S608. In step S610 the temporary variable COLOUR is set to equal the value of bit 0of the transformed image T_IMAGE. The variable COLOUR is used to track whether a run being run length encoded is a run of 0s or 1s. This variable will contain the actual run-length minus one. In step S611, one bit representing the bit value of the variable COLOUR is output. This bit is effectively the first bit in the output sequence of run lengths.

Next, steps S612 to S624 advance index i within T_IMAGE. Temporary variable COUNTER keeps count of the number of the currently counted consecutive adjacent like bits, representing a single colour (i.e. having value "0" or "1") within T_IMAGE. Once a change in pixel type is detected in steps S612 a further temporary variable RLE is set to the current value of counter COUNTER in step S614, thereby counting the length of the current run of adjacent "0"s or adjacent "1"s in pixels. The value of RLE is encoded in steps S628 and onwards.

As noted, variable bit sizes are used to encode the run-lengths. In the depicted embodiment, each run length is encoded in a token of adjacent bits or a set of tokens of adjacent bits. The token size used to encode a run, is based on the token size used to encode the previous run of bits of the same colour. If a token having the current run-length bit size is insufficiently large to encode the current run-length, the run length is encoded as a series of tokens. In this case, a token of the maximum value that can be represented by the token is encoded. This serves as a token-continuation flag. A subsequent token of double the size of the current token encodes the run length minus the maximum value encoded in the previous token. If this second token is also not sufficient for encoding the run length, this process of extending the set of increasing sized tokens is continued until the run length has been encoded. The end of a token set is signalled by any token not equal to the maximum value that can be encoded by the token.

The token size for the next run-length of the same colour bits is set to the minimum number of bits required to encode the present run length as a single token. In the depicted embodiment, these token widths are maintained in variables TOKEN_SIZE_DARK and TOKEN_SIZE_LIGHT. Of course, token size need not be doubled, but could be increased in another predictable manner. For example, token sizes could be increased a fixed number of bits, or in accordance with a defined pattern (e.g. 2, 3, 4, 6, 8, 16, 32, 64 bits).

As the run-length of sequential runs of light pixels are somewhat correlated and sequential run-lengths of dark pixels are also somewhat correlated in T_IMAGE, separate encoding lengths are used for dark and light pixels. As such, a determination of the colour of the current run is assessed in step S628. Run lengths of dark pixel runs (i.e. runs of 1s) are encoded in steps S630 and onwards. Run lengths of light pixel runs (i.e. runs of 0s) are encoded in steps S660 and onwards.

Thus, for light pixels, the bit size required to encode the current run-length (as counted by variable RLE) is compared to an assumed bit size based on the bit size of the previous token, used to encode the last run-length of pixels of the current colour (i.e. dark) in step S631 (as maintained in TOKEN_SIZE_DARK).

If the token size is insufficient to encode the run length, the run length is encoded with a series of increasingly sized tokens. In the depicted embodiment, for light pixels, the token size is doubled in steps S638. This is repeated as a result of step S636 until the remainder of the run length can be fully encoded in one more single tokens. In step S640 a bit pattern corresponding to the run-length having the adjusted run-length size TOKEN_SIZE_DARK is output.

In order to signal that the run length is encoded in a series of tokens (rather than one token) a progression of run length sizes with a recognizable bit-pattern are output in step S632. That is, tokens smaller than the bit size required to encode the current run length having all "1"s are output. Of course other bit patterns (e.g. all "0"s; alternating "1"s and "0"s, etc) could be used. As well, as the run length will exceed the values of smaller token sizes, the value represented by the smaller token size is subtracted from the value to be encoded in step S634.

If, however, the token size used to encode the last run length is sufficiently large for the current run length (as contained in TOKEN_SIZE_DARK), as determined in step S631, TOKEN_SIZE_DARK bits representing the current run length are output. The next token size to be used for a run length of bits representing dark pixels is set to the minimum number of bits actually required to encode the current run length in a single token as assessed in step S646. Notably, this run length bit size is derived from the value of RLE, temporarily stored in step S630 prior to any adjustment in step S634. For example, in the depicted embodiment, if the current run length equals the hexadecimal value 0×42, the token size for the current run length will be 8 bits. However, the token size for the next run length encode will be 7 bits.

After the current run length has been output in step S642, and the token size has been adjusted, if necessary, the variable COLOUR is toggled in step S648 signifying the next run will have the complementary colour. As well, the counter variable, COUNTER, used to count the next run-length, is reset to 0 in step S650.

After the present run length is encoded, index variable is incremented in step S618 and steps S612 and onward are repeated, encoding the next and following runs until the entire transformed image has been encoded as a series of runs.

So as will now be appreciated, the transformed image will be encoded as a series of run lengths, represented by varying bit sizes. By definition, a run of dark pixels ("1"s) follows a run of light pixels ("0"s) and vice-versa. The bit size used to encode the lengths of sequential runs of one colour (i.e. dark or light) may either increase or decrease from run length to run length of the same colour, in a predetermined manner.

In the disclosed embodiment, the value of a run length of one colour is used to predict the token width requirement of the next run length of the same colour. As the bit-width requirements for run length encoding tend to correlate within the domain of the same colour, this provides an efficient, automatically adjusting token-size in encoding. In the event that a run length exceeds the predicted token size, some overhead is used to signal a change in token/run length size.

The token size used to encode the current run length (or the first token of the run length in the event of an overflow) equals the token size that would be required to encode the previous run length of the same colour into a single token. This calculation is performed with no consideration to the actual number of bits used to encode the previous run length. In other words no consideration is given to the previous run length overflowing its token size, if it has done so.

The output bit sequence, RL_IMAGE, representing the encoded run lengths will include a sequence of variable length tokens. Each token either contains data used to encode a run length or an identifier (in the form of a token having a defined bit pattern—e.g. all 1s) that the next token within the sequence is larger than the current token. As well, the value of the initial bit of the encoded image is contained as the first bit of the output stream.

As should now be appreciated, transformation steps S500 and encoding steps S600 have been illustrated as distinct blocks, each acting on an entire image for ease of illustration. Both transformation and encoding could easily be combined, and could perform on the image line by line. That is, a line of the original image may be transformed (XORed) and immediately run-length encoded. As such, there would not a requirement to hold in memory any more that the current line and the previous line in order to perform the complete image transform.

Figure 9:
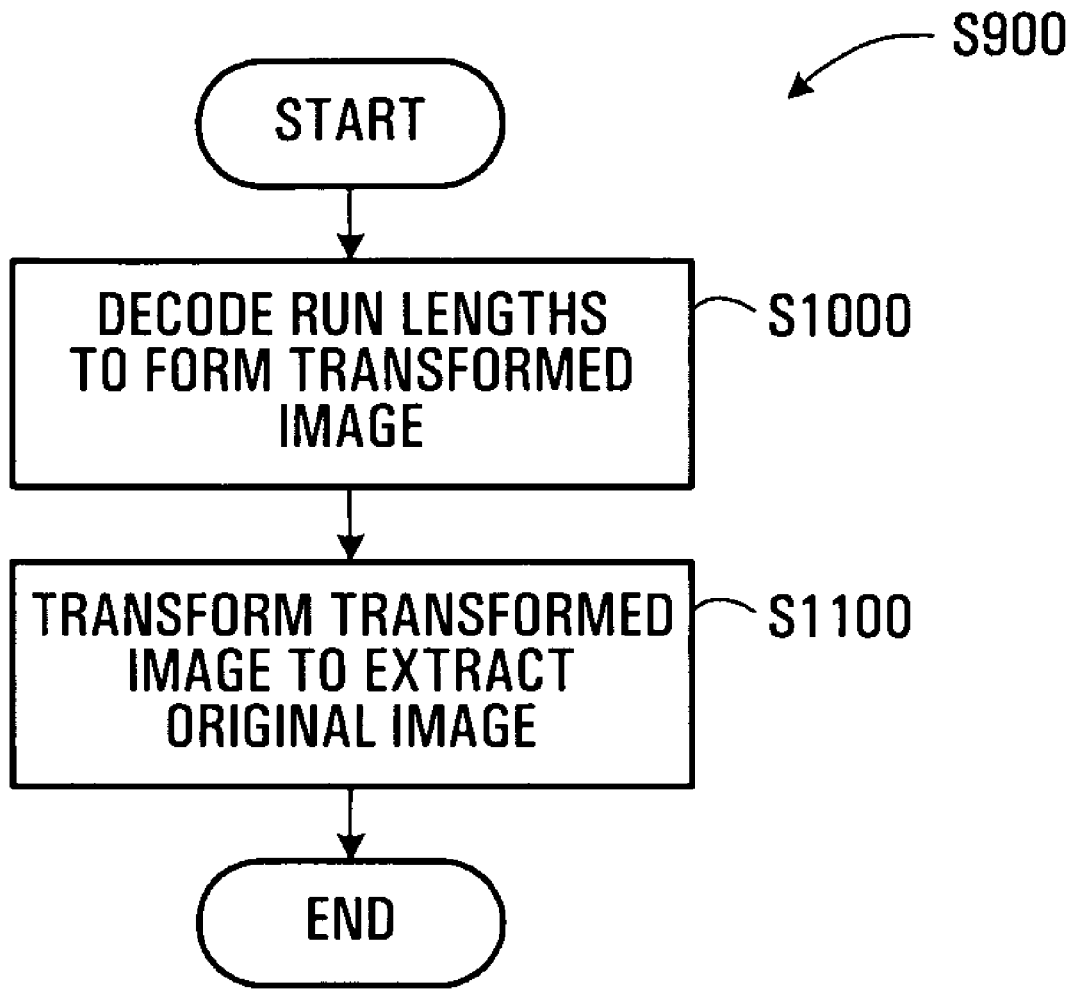
FIGS. 9, 10A-10C, and 11 are flow charts illustrating exemplary steps used to decompress a sequence of run-lengths to form a bi-level image, previously compressed using steps depicted in FIGS. 4, 5 and 6A-6C.

An image compressed using steps S400-S600 may be decoded using complementary steps S900 depicted in FIG. 9. Specifically, sequential values representing the compressed image (assumed to be stored in a one dimensional array RL_IMAGE) are decoded as a series of run lengths of alternating colours. A number of zeros or ones (i.e. dark and light pixels) corresponding to the run lengths are presented, to reproduce the transformed image in steps S1000. Steps S1100, complementary to steps S500, are performed to losslessly reproduce the originally encoded image.

Figure 10A:
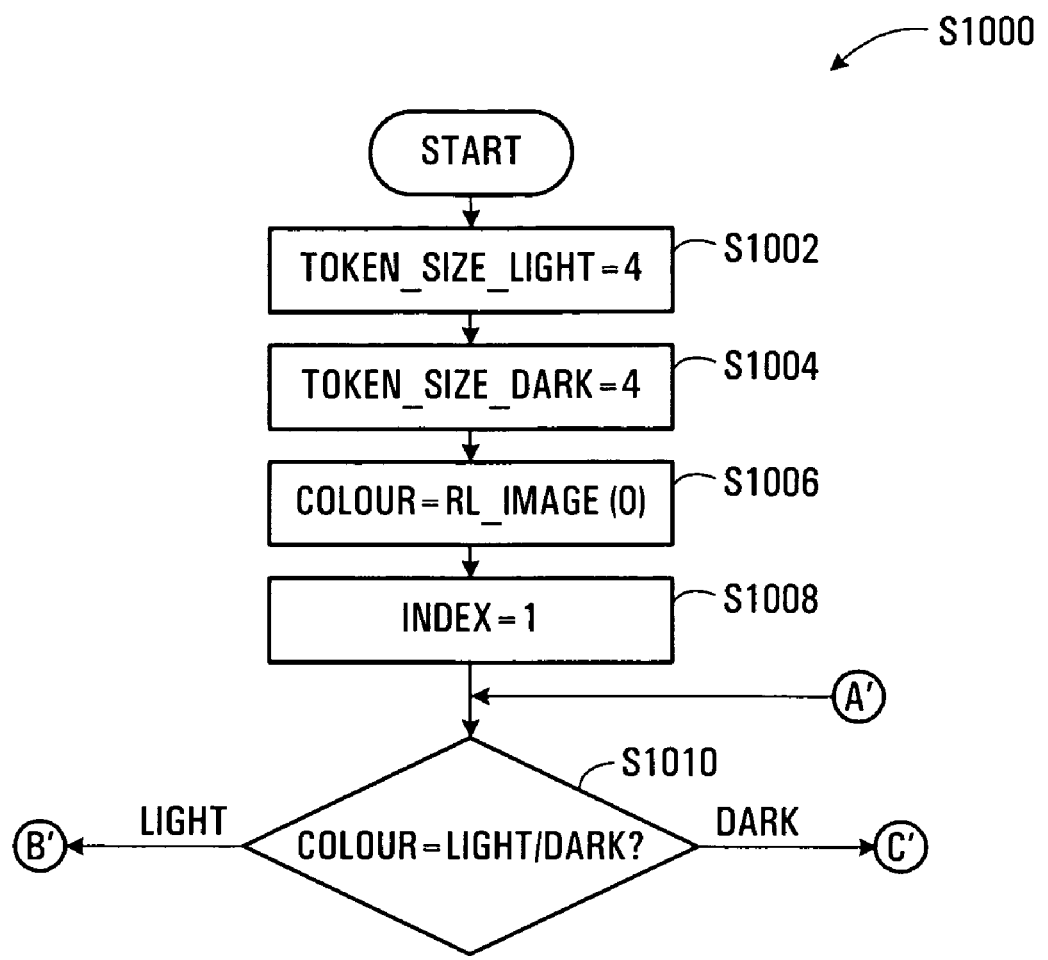
Figure 10B:
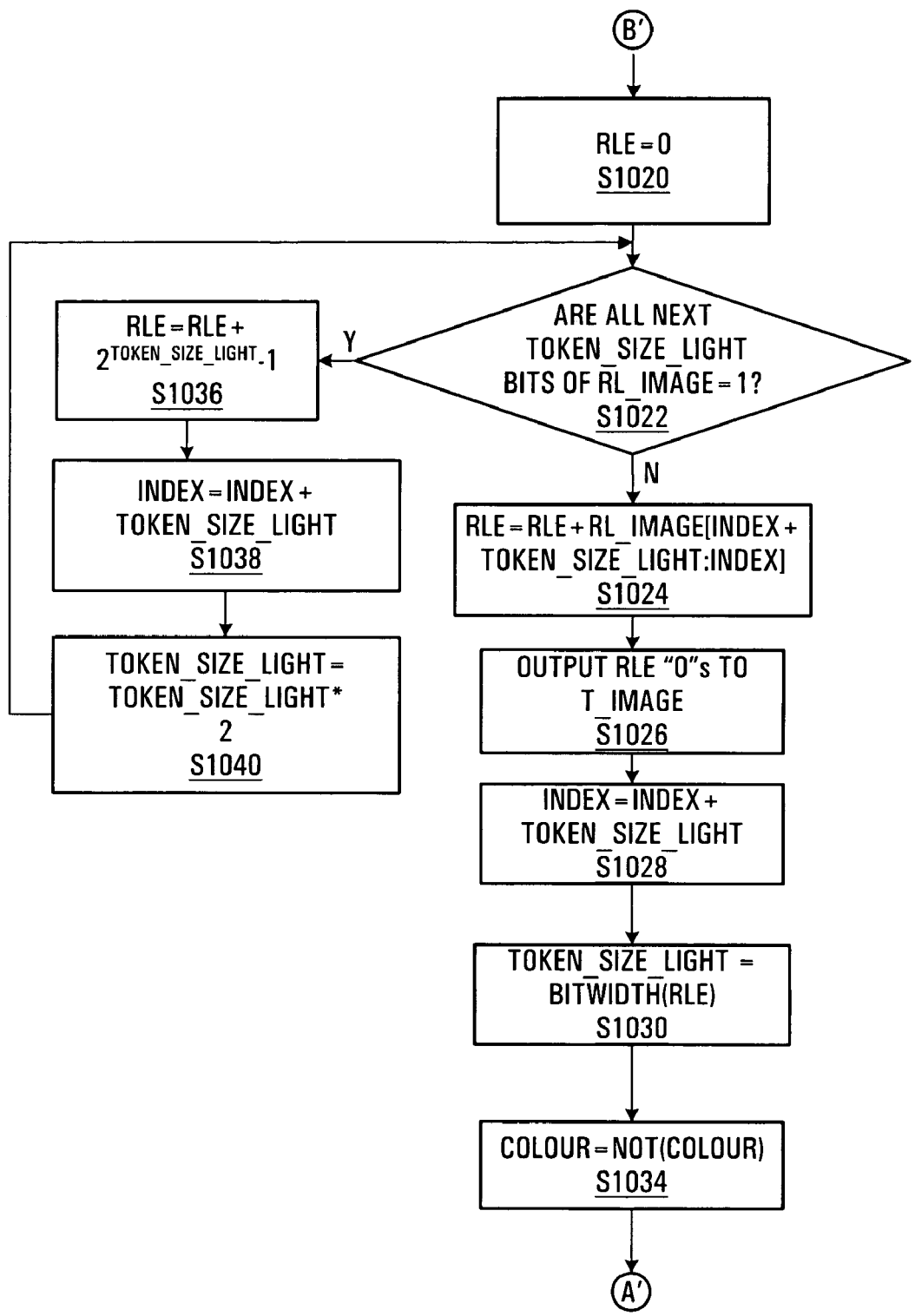
Figure 10C:
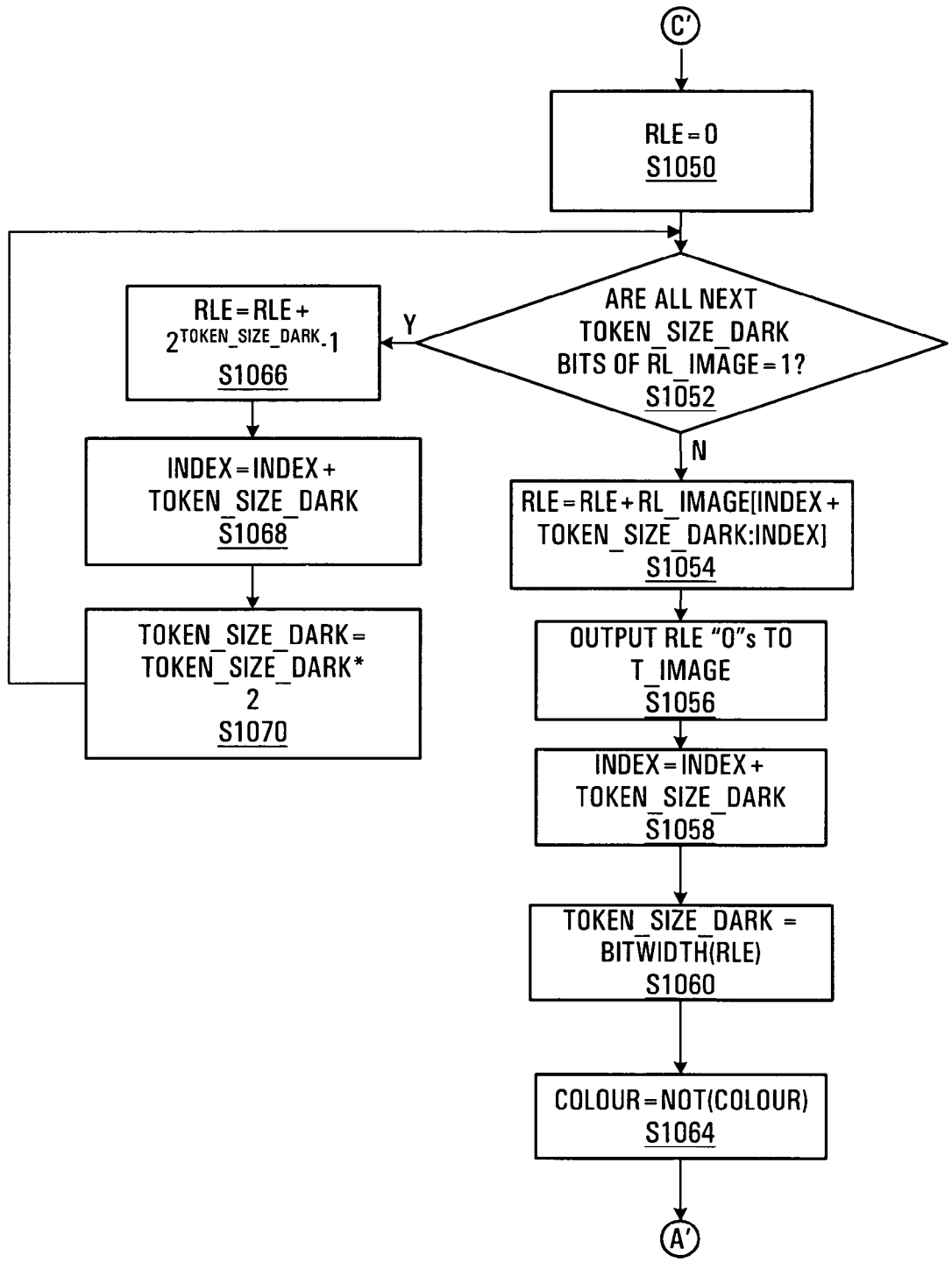
Figure 11:
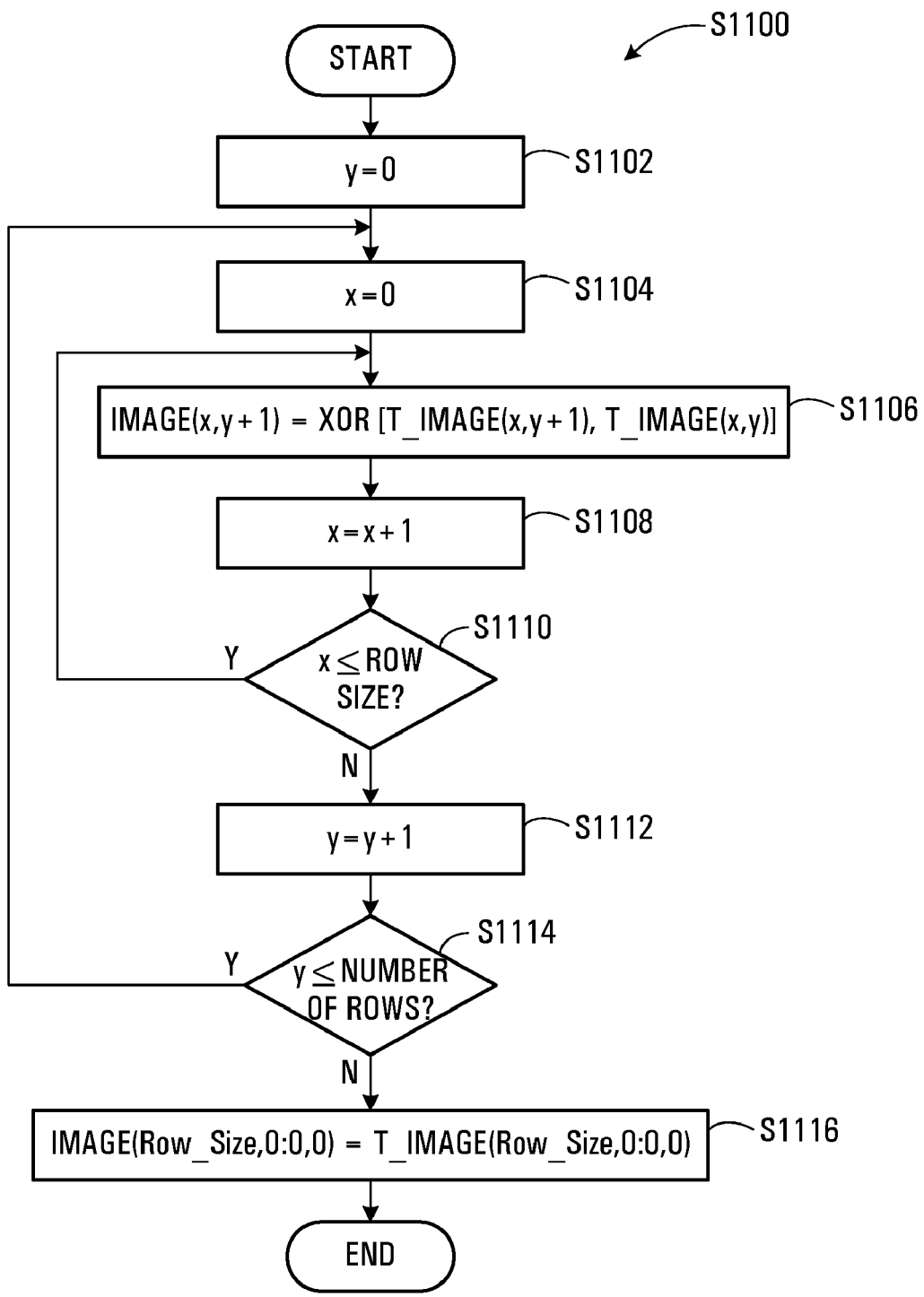

Steps S1000-S1100 are more specifically illustrated in FIGS. 10A-10C and 11. As illustrated in FIG. 10A-10C two independent run-length bit sizes are again used. In the depicted embodiment, the assumed run-length size for the current run (in bits) is maintained in temporary variables TOKEN_SIZE_LIGHT for light pixels, and TOKEN_SIZE_DARK for dark pixels. The values are initialized to a chosen initial value in steps S1002 and S1004. In the depicted embodiment, they are initialized to a value of 4.

Next, the received compressed image, assumed to be stored as a series of bits representing a sequence of tokens in the variable RL_IMAGE, is initially decoded by examining its first bit to assess whether it is a "0" or "1" in step S1006. This value indicates whether the first run in the image is a run of light or dark pixels (i.e. "0"s or "1"s). A temporary index variable, INDEX, is used to index entries of RL_IMAGE as the compressed image is decompressed. It is initialized to the value of 0 in step S1008.

Next, the length of the current run of dark or light pixels is assessed by examining a token of RL_IMAGE having the number of bits corresponding to the assumed run-length bit size.

As independent light and dark run length sizes are used for runs of light and dark pixels, steps S1020-S1040 are used to extract runs of 1s. Identical steps S1050-S1070 are used to extract runs of 0s. An assessment of whether the current run is a run of 0s or 1s is made in step S1010.

In decoding each run-length, a token having the same bit size as that used to encode the run-length is used. The token size is initially assumed to be equal the minimum number of bits required to encode the last run length into a single token. Specifically, if all bits in the token having the assumed bit size (as contained in the next TOKEN_SIZE_DARK bits of RL_IMAGE) are "1", as determined in step S1022, the run length is assumed to be encoded by one or more additional directly subsequent tokens. The token size is adjusted in step S1036-S1040. In the depicted embodiment, its token size is doubled in step S1040. Once adjusted, step S1022 is repeated to assess if the next token (i.e. the next TOKEN_SIZE_DARK bits in RL_IMAGE) having the new assumed size is still all "1"s. If so the run length is again doubled. Thus, steps S1022 and S1036-S1040 are repeated until a token having the presumed number of bits representing the encoded run length in RL_IMAGE, not having all "1"s is encountered. Smaller tokens having a value of all "1"s are used to signal an increase in token size. Effectively decoding steps S1022 and S1036-S1040 complement encoding steps S632-S636, used to encode and upwardly adjustment in token size.

The currently decoded run length is decoded as the value of the token not having all "1"s, plus the sum of any tokens used to signal an increase in the token bit size (i.e. all tokens having a bit size between the assumed bit size, and the bit size of the token not having all "1"s), as summed in steps S1038 and S1024. A corresponding number of dark pixels ("1" bits) may now be output in step S1026 to populate an array representing the decoded transformed image T_IMAGE.

As each run length is extracted from RL_IMAGE, a temporary index maintained in variable INDEX is incremented in steps S1028 and S1040.

At the conclusion of extracting a run, an assessment is made to determine if the length of the run could have been encoded in a token, having one half the size of assessed RUN_LENGTH_DARK in step S1030. If so, the assumed run-length bit size, used for the next run of the same colour, is halved in step S1032. Steps S1030 to S1032 effectively complement S644 to S646 used to downwardly adjust the token size used to encode runs.

Once a run has been extracted, the indicator of the current colour (COLOUR) is toggled in step S1034 (i.e. if the current colour is light, the next colour will be light, and vice-versa) and steps S1010 and onward are repeated to decode further runs encoded in RL_IMAGE.

Identical steps S1050-S1070 are performed for runs of the complementary colour.

Once all encoded runs have been decoded, a transformed image will have been decoded, and be stored in array T_IMAGE. Thereafter steps S1100 (substantially identical to steps S500) are performed on the transformed image, reproducing the original image without losses. Again, adjacent rows of T_IMAGE are XORed to extract the original image, losslessy. The width and height of the image are assumed to be know, or could be encoded as part of the header of the received run length.

As will now be appreciated, depending on the application, computing device 10 may include software for both encoding and decoding images in manners exemplary of embodiments of the present invention. So, exemplary software could be used in the compression of bi-level facsimile or print images; to de-compress bi-level images stored in memory or ROM; to compress scanned bi-level images; or to otherwise store compressed data on a computer readable medium; and the like. Similarly, compressed data could be transferred by way of a data providing medium, such as a wireless transmission medium, a wired computer network, or the like.

A set of five images with varying levels of content and redundancy were encoded with various existing compression techniques and with the variable length RLE of FIGS. 4, 5, and 6A-6C. The results from this test are shown in Table I.

TABLE I

|  | Image1 | Image2 | Image3 | Image4 | Image5 |
|---|---|---|---|---|---|
| JPEG | 129,985 | 151500 | 226188 | 281026 | 351591 |
| Packbits | 88608 | 64700 | 83316 | 59466 | 79830 |
| Huffman | 138646 | 29328 | 45814 | 41416 | 54048 |
| CCITT Group 3.1D | 138254 | 28776 | 45260 | 40854 | 53586 |
| CCITT Group 4.2D | 24670 | 8302 | 16042 | 25226 | 38734 |
| Variable bit size RLE | 2250 | 7636 | 17423 | 27872 | 45742 |

Although exemplary compression techniques are particularly well suited for compressing/encoding a bi-level image, steps S600 or S1000 could be used to run length encode an arbitrary series of runs of adjacent 1s and 0s, using variable bit sizes to encode the runs. The series of runs need not represent an image, or an encoded image. Similarly, the exemplary compression techniques could be used to compress alternating runs of a first symbols and second symbols. Symbols of the first and second types need not be identical, but run lengths should be correlated. Bytes (or other symbols) interspersed between run-lengths could be used to identify the symbol represented by each run length.

Many variations to the depicted embodiment should now be apparent to a person of ordinary skill. For example, the next token size for the current colour could be adjusted to equal the greater of the token sizes required to encode the last two run lengths of the same colour.

Similarly, the adjustment of token length size could be varied. For example, each time an additional token is needed to encode a run length, this additional token could have a bit width equal to the bit width of the maximum possible run length. As such, no more than one overflow token would be required to encode any given run length.

As well, a particular application-specific use of the compression method may result in certain observable reoccurring patterns in run lengths. This observed behaviour could be used to predict token sizes so as to improve the accuracy in predicting the optimum size for the tokens.

Example C code embodying compression/decompression methods exemplary of embodiments of the present inventions is attached as Appendix "A".

Of course, the above described embodiments are intended to be illustrative only and in no way limiting. Depicted method steps are exemplary only. People of ordinary skill will readily appreciate numerous ways of implementing the invention using software, hardware, firmware or otherwise. The described embodiments of carrying out the invention are susceptible to many modifications of form, arrangement of parts, details and order of operation. The invention, rather, is intended to encompass all such modification within its scope, as defined by the claims.

What is claimed is:

1. A method of encoding a bit sequence of alternating runs of adjacent 1s and adjacent 0s, said method comprising:
   determining the run-length of each of said runs of adjacent 0s in said sequence;
   determining the run-length of each of said runs of adjacent 1s in said sequence;
   encoding each of said run-lengths of said runs of adjacent 0s using a varying bit size, wherein said varying bit size used to encode each of said run-lengths of adjacent 0s is varied in dependence on the bit size used to encode a run-length of a prior run of adjacent 0s in said bit sequence.

2. The method of claim 1, wherein said prior run of adjacent 0s is said immediately prior run of adjacent 0s in said bit sequence.

3. The method of claim 1, wherein said varying bit size used to encode each of said adjacent run-lengths of 0s is varied in dependence on the bit size used to encode run-lengths of two immediately prior runs of adjacent 0s in said bit sequence.

4. The method of claim 1, further comprising:
   encoding each of said run-lengths of said runs of adjacent 1s using a varying bit size, wherein said varying bit size used to encode each of said adjacent run-lengths of 1s is varied in dependence on the bit size used to encode a run-length of a prior run of adjacent 1s in said bit sequence.

5. The method of claim 4, wherein said prior run of adjacent 1s is said immediately prior run of adjacent 1s in said bit sequence.

6. The method of claim 4, wherein said varying bit size used to encode each of said adjacent run-lengths of 1s is varied in dependence on the bit size used to encode run-lengths of two immediately prior runs of adjacent 1s in said bit sequence.

7. The method of claim 3, wherein the bit size used to encode each of said run lengths of adjacent 0s equals (i) the minimum number of bits required to encode a run-length of an immediately prior run of adjacent 0s in said bit sequence, or (ii) $2^N$ times the minimum number of bits required to encode a run-length of an immediately prior run of adjacent 0s in said bit sequence, where N is an integer.

8. The method of claim 5, wherein the bit size used to encode each of said run lengths of adjacent 1s equals (i) the minimum number of bits required to encode a run-length of an immediately prior run of adjacent 1s in said bit sequence; or (ii) $2^N$ times the minimum number of bits required to encode a run-length of an immediately prior run of adjacent 1s in said bit sequence, where N is an integer.

9. The method of claim 4, wherein said bit size used to encode each of said run lengths of adjacent 0s is increased in a predetermined manner from the bit size used to encode a run-length of an immediately prior run of adjacent 0s in said sequence to accommodate the current run-length of adjacent 0s.

10. The method of claim 9, wherein said bit size used to encode each of said run lengths of adjacent 1s is increased in a predetermined manner from the bit size used to encode a run-length of an immediately prior run of adjacent 1s in said sequence to accommodate the current run-length of adjacent 1s.

11. The method of claim 4, wherein said bit size used to encode each of said run lengths of adjacent 0s is increased to a maximum allowable bit size for run lengths of adjacent 0s if said bit size used to encode a run length of an immediately prior run of adjacent 0s in said bit sequence is insufficient for a current run length of adjacent 0s in said bit sequence.

12. The method of claim 11, wherein said bit size used to encode each of said run lengths of adjacent 1s is increased to a maximum allowable bit size for run lengths of adjacent 1s, if said bit size used to encode a run length of an immediately prior run of adjacent 1s in said bit sequence is insufficient for a current run length of adjacent 1s in said bit sequence.

13. A method of encoding a rasterized bi-level image, comprising:
    forming a bit sequences of 1s and 0s to represent said image; and
    encoding said bit sequence in accordance with the method of claim 1.

14. The method of claim 13, wherein said forming comprises:
    forming a bit sequence of 1s and 0s representing relative brightness of pixels in said image;
    arranging said bit sequence representing relative brightness in rows and columns;
    XORing adjacent ones of said rows to form said bit sequence of 1s and 0s representing said image.

15. The method of claim 14, wherein said image is a scanned image.

16. The method of claim 15, wherein said image is stored in read-only memory.

17. The method of claim 16, further comprising transmitting said bit sequence by way of a communications channel.

18. A method of decoding a series of run-lengths into alternating runs of adjacent 0s and 1s representing computer readable data, said run lengths encoded using varying numbers of bits, said method comprising:
    determining an assumed bit size used to encode a current run-length of 0s based on a bit size used to decode an immediately prior run length of 0s;
    increasing said assumed bit size of said current run-length if all bits in said run length having said assumed bit size have a defined pattern, to form an adjusted bit size where all bits in said run-length having said adjusted bit size do not have said defined pattern;
    extracting a number of adjacent 0s, said number based on a value in binary of said run-length having said adjusted bit size.

19. The method of claim 18, further comprising:
    determining an assumed bit size for a current run-length of a run of 1s based on a bit size of an immediately prior run length of a run of 1s;
    increasing said assumed bit size of said current run-length of said run of 1s if all bits in said current run-length of said run of 1s having said assumed bit size, have said defined pattern, to form an adjusted bit size for said current run-length of said run of 1s, where all bits in said current run-length of said run of 1s, having said adjusted bit size, do not have said defined bit pattern;
    extracting a number of adjacent 1s, said number based on a value in binary of said run-length of said run of 1s, having said adjusted bit size.

20. The method of claim 19, wherein said determining an assumed bit size for a current run-length of a run of 0s comprises determining a bit size equal to said bit size required to encode said immediately prior run length of a run of 0s.

21. The method of claim 20, wherein said determining an assumed bit size for a current run-length of a run of 1s comprises determining a bit size equal to said bit size required to encode said immediately prior run length of a run of 1s.

22. A computing device comprising a processor in communication with processor readable memory storing processor executable instructions, adapting said computing device to encode a bit sequence of alternating runs of adjacent 1s and adjacent 0s, by:
    determining the run-length of each of said runs of adjacent 0s in said sequence;
    determining the run-length of each of said runs of adjacent 1s in said sequence;
    encoding each of said run-lengths of said runs of adjacent 0s using a varying bit size,
    wherein said varying bit size used to encode each of said run-lengths of adjacent 0s is varied in dependence on the bit size used to encode a run-length of a prior run of adjacent 0s in said bit sequence.

23. Computer readable memory storing computer executable instructions, that when executed at a computing device adapt said computing device to encode a bit sequence of alternating runs of adjacent 1s and adjacent 0s, by:
    determining the run-length of each of said runs of adjacent 0s in said sequence;
    determining the run-length of each of said runs of adjacent 1s in said sequence;
    encoding each of said run-lengths of said runs of adjacent 0s using a varying bit size, wherein said varying bit size used to encode each of said run-lengths of adjacent 0s is varied in dependence on the bit size used to encode a run-length of a prior run of adjacent 0s in said bit sequence.

24. Computer readable medium storing a bit sequence representing a plurality of sequential tokens of varying bit sizes, each token representing one of i) data encoding a run length in a sequence of first and second symbols; and ii) an indicator that the bit size of the next token in said plurality of sequential tokens has changed from the size of the current token.

25. The computer readable medium of claim 24, wherein a token indicating that the bit size of the next token has changed, comprises a defined bit pattern.

26. The computer readable medium of claim 25, wherein said a token of said defined bit pattern has all 1s.

27. A method of encoding a sequence of alternating runs of adjacent first symbols and adjacent second symbols, said method comprising:
    determining the run-length of each of said runs of adjacent first symbols in said sequence;
    determining the run-length of each of said runs of adjacent second symbols in said sequence;
    encoding each of said run-lengths of said runs of adjacent first symbols using a varying bit size, wherein said varying bit size used to encode each of said run-lengths of adjacent first symbols is varied in dependence on the bit size used to encode a run-length of a prior run of adjacent first symbols in said sequence.

28. The method of claim 27, further comprising:

encoding each of said run-lengths of said runs of adjacent second symbols using a varying bit size, wherein said varying bit size used to encode each of said adjacent run-lengths of second symbols is varied in dependence on the bit size used to encode a run-length of a prior run of adjacent second symbols in said sequence.

29. A data providing medium providing a bit sequence representing a plurality of sequential tokens of varying bit sizes, each token representing one of i) data encoding a run length in a sequence of first and second symbols; and ii) an indicator that the bit size of the next token in said plurality of sequential tokens has changed from the size of the current token.

* * * * *

UNITED STATES PATENT AND TRADEMARK OFFICE
CERTIFICATE OF CORRECTION

PATENT NO. : 7,483,585 B2
APPLICATION NO. : 11/000792
DATED : January 27, 2009
INVENTOR(S) : Edward W. Brakus, Jr.

It is certified that error appears in the above-identified patent and that said Letters Patent is hereby corrected as shown below:

In claim 19, column 12, line 4, "adjacent is" should appear as --adjacent 1s--

Signed and Sealed this
Twelfth Day of March, 2013

Teresa Stanek Rea
*Acting Director of the United States Patent and Trademark Office*